US012211068B1

(12) United States Patent
Williams

(10) Patent No.: US 12,211,068 B1
(45) Date of Patent: Jan. 28, 2025

(54) PROMOTIONAL ADVERTISEMENT APPARATUS

(71) Applicant: Promo Drone, San Diego, CA (US)

(72) Inventor: Jamar Williams, San Diego, CA (US)

(73) Assignee: Promo Drone, San Diego, CA (US)

( * ) Notice: Subject to any disclaimer, the term of this patent is extended or adjusted under 35 U.S.C. 154(b) by 0 days.

(21) Appl. No.: 18/483,480

(22) Filed: Oct. 9, 2023

Related U.S. Application Data

(63) Continuation of application No. 16/678,494, filed on Nov. 8, 2019, now abandoned.

(60) Provisional application No. 62/868,610, filed on Jun. 28, 2019.

(51) Int. Cl.
*G06Q 30/00* (2023.01)
*G06Q 20/12* (2012.01)
*G06Q 30/0251* (2023.01)
*G09F 9/30* (2006.01)
*G09F 21/08* (2006.01)
*B64U 10/13* (2023.01)
*B64U 101/24* (2023.01)
*G05B 19/418* (2006.01)

(52) U.S. Cl.
CPC ........ *G06Q 30/0265* (2013.01); *G06Q 20/12* (2013.01); *G06Q 30/0267* (2013.01); *G06Q 30/0269* (2013.01); *G09F 9/30* (2013.01); *G09F 21/08* (2013.01); *B64U 10/13* (2023.01); *B64U 2101/24* (2023.01); *B64U 2201/20* (2023.01)

(58) Field of Classification Search
None
See application file for complete search history.

(56) References Cited

U.S. PATENT DOCUMENTS

| | | | |
|---|---|---|---|
| 9,599,985 B2 * | 3/2017 | Wang | G05D 1/0022 |
| 10,370,101 B2 | 8/2019 | Kales | |
| 10,827,339 B1 | 11/2020 | Ruschhaupt | |
| 10,991,007 B2 | 4/2021 | Ta et al. | |
| 11,258,625 B2 * | 2/2022 | Decenzo | G05D 1/0276 |
| 2007/0039218 A1 | 2/2007 | Shaffer | |
| 2009/0050750 A1 | 2/2009 | Goossen | |
| 2012/0069131 A1 * | 3/2012 | Abelow | G06Q 30/0601 345/589 |
| 2017/0129602 A1 | 5/2017 | Alduaiji et al. | |
| 2017/0137125 A1 | 5/2017 | Kales | |
| 2018/0082615 A1 * | 3/2018 | Cheung | G09F 21/04 |
| 2018/0165998 A1 | 6/2018 | Bogan, III | |
| 2018/0210118 A1 * | 7/2018 | Gollier | G09F 9/30 |
| 2018/0299883 A1 * | 10/2018 | Terzian | G05D 1/0027 |
| 2018/0308130 A1 | 10/2018 | Hafeez et al. | |

(Continued)

FOREIGN PATENT DOCUMENTS

WO      2015199535 A1     12/2015

OTHER PUBLICATIONS

"The State-of-the-Art of Human-Drone Interaction: A Survey". IEEE. 2019. (Year: 2019).*

(Continued)

*Primary Examiner* — Maria V Vanderhorst
(74) *Attorney, Agent, or Firm* — Snell & Wilmer, L.L.P.; April Wurster

(57) ABSTRACT

A hovering promotional advertisement apparatus includes a digital screen configured to display promotional advertisements and a hovering mechanism configured to secure the digital screen in a position hovering in air.

7 Claims, 4 Drawing Sheets

(56) References Cited

U.S. PATENT DOCUMENTS

| | | | |
|---|---|---|---|
| 2018/0322749 | A1 | 11/2018 | Kempel et al. |
| 2019/0087145 | A1 | 3/2019 | Park et al. |
| 2019/0166765 | A1 | 6/2019 | Maor |
| 2019/0384788 | A1 | 12/2019 | Pratt et al. |
| 2020/0396852 | A1 | 12/2020 | Yoo et al. |
| 2020/0402099 | A1* | 12/2020 | Pittman .................. H04W 4/02 |
| 2020/0410540 | A1 | 12/2020 | Williams |
| 2021/0129982 | A1 | 5/2021 | Collins et al. |
| 2022/0182521 | A1* | 6/2022 | Kim .................... H04M 1/0235 |

OTHER PUBLICATIONS

"ShopAssist—A unified location-aware system for shopping". IEEE. 2016 (Year: 2016).*

Advisory Office Action issued in U.S. Appl. No. 16/678,494 dated Jan. 11, 2023.

B & H Foto & Electronics Corp. (2000-2024) "xFold rigs Dragon x12 Multi-Rotor (RTF, U11 Motor)," 2 pages. [Accessible on the Internet at URL: https://www.bhphotovideo.com/c/product/1151523-REG/xfold_xf_dr_x12u11_rtf_dragon_x12_multi_rotor_rtf.html/quick-compare] [Access Date: Jan. 31, 2024].

Final Office Action issued in U.S. Appl. No. 16/678,494 dated Oct. 26, 2023.

Final Office Action issued in U.S. Appl. No. 16/678,494 dated Sep. 2, 2022.

Google Lens (Search Completed Prior to Oct. 26, 2023) [Accessed at URL: [https://lens.google.com/search?p=AXAp4whySChbSIn1-pGohBFX2bS43xfevR5mqrGDMwMrZ1VDEqcZv4nxFaljxLby7c Y8yQf1g2Y7i2yXo6qHM5PBE0m6WirsIGrHKopdV80Xs3xbL8XzT_ olK1TiU8IBT0BefFV98UkPoO4mplZ8gGA6WL4rQUOHI4M-d7GhOc9fulPIEP2dFywYccvPgJWMnYwDmrG5vlu0mLZcfZlu5s ftgG97c5LfyzTkyvt1MZvka5tD91mUAG5xuv24GmRo.
IRJET-V616596; IRJET; p. 2935-p. 2939; Jun. 2019.

Non-Final Office Action issued in U.S. Appl. No. 16/678,494 dated Feb. 17, 2022.

Non-Final Office Action issued in U.S. Appl. No. 16/678,494 dated Mar. 3, 2023.

Non-Final Office Action issued in U.S. Appl. No. 16/678,494 dated May 25, 2023.

Prodrone Co., Ltd. (Sep. 7, 2017) "Prodrone Develops the Night Surveyor Drone," 5 pages. [Accessible on the Internet at URL: https://www.prodrone.com/release-en/2867/] [Access Date: Jan. 31, 2024].

TERIA (Sep. 26, 2019) "WeedElec—Robotic Agriculture," 4 pages. [Accessible on the Internet at URL: https://www.reseau-teria.com/language/en/2019/09/26/robotic-agriculture/] [Access Date: Jan. 31, 2024].

Theiss UAV Solutions, LLC (2022) "Airborne Speaker Systems," 5 pages. [Accessible on the Internet at URL: https://www.theissuav.com/speaker-systems#new-page-2] [Access Date: Jan. 31, 2024].

* cited by examiner

PROMOTIONAL ADVERTISEMENT APPARATUS

CROSS-REFERENCE TO RELATED APPLICATIONS

This application is a continuation of U.S. patent application Ser. No. 16/678,494, filed Nov. 8, 2019, which claims priority to U.S. Provisional Application No. 62/868,610, filed on Jun. 28, 2019, the entire contents of each of which are incorporated herein by reference.

BACKGROUND

Product and message advertisement/announcements are critical to most organizations, big or small, whether outward facing to provide interest and information to people outside an organization or inward facing to provide interest and information to those within the organization.

As society progresses and technology advances, the ability to reach individuals has become easier in many ways and at the same time more challenging in others. Current common practices in advertising include physical static advertisements (e.g., printed banners, flyers, bracelets, mail, billboards, street easel ad boards, etc.) and digital advertisements (e.g., electronic billboards, large screen displays at events (jumbotron), consumer television, personal electronic devices, etc.), which may be static or dynamic advertisements, where the dynamic advertisements may display a variety of advertisements on a rotation schedule using capable digital displays.

However, with exception of the portable, handheld personal electronic devices, the physical mediums and mechanisms of delivering the current modes of advertising generally end up being positioned in a static location such that the advertisement delivery mechanisms remain in place until otherwise physically removed. In other words, while traditional advertisements may be strategically positioned to be within the viewpoint of individuals as they go about their lives—whether walking through a park or on a street, working, driving, flying, etc.—traditional advertising means do not have the ability to be instantaneously repositioned to either catch the attention of a different person facing a different direction or the same person as their visual field changes with movement. Thus, though a person may come across the display multiple times as the person passes by perchance, the ad does not go with the person or have an ability to engage the person. A mailed or handed out advertisement may go with a person, however, such types of advertisements are more often than not considered "spam" and tossed out, and certainly have no ability to actively engage the person.

Moreover, while the advent of personal electronic devices certainly has the ability to captivate the attention of a user, when not in use, such devices are typically pocketed and the device must resort to other means to regain the attention of the user.

Finally, in some instances, electronic flying drones have been used to carry and display static banners thereon to provide advertisement to people. However, due to unpredictability of the environment and limitations of the drones used, often the static advertisements are ineffective.

Therefore, the field of advertisement has a need to improve and change the way to engage individuals.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

Figure 1:
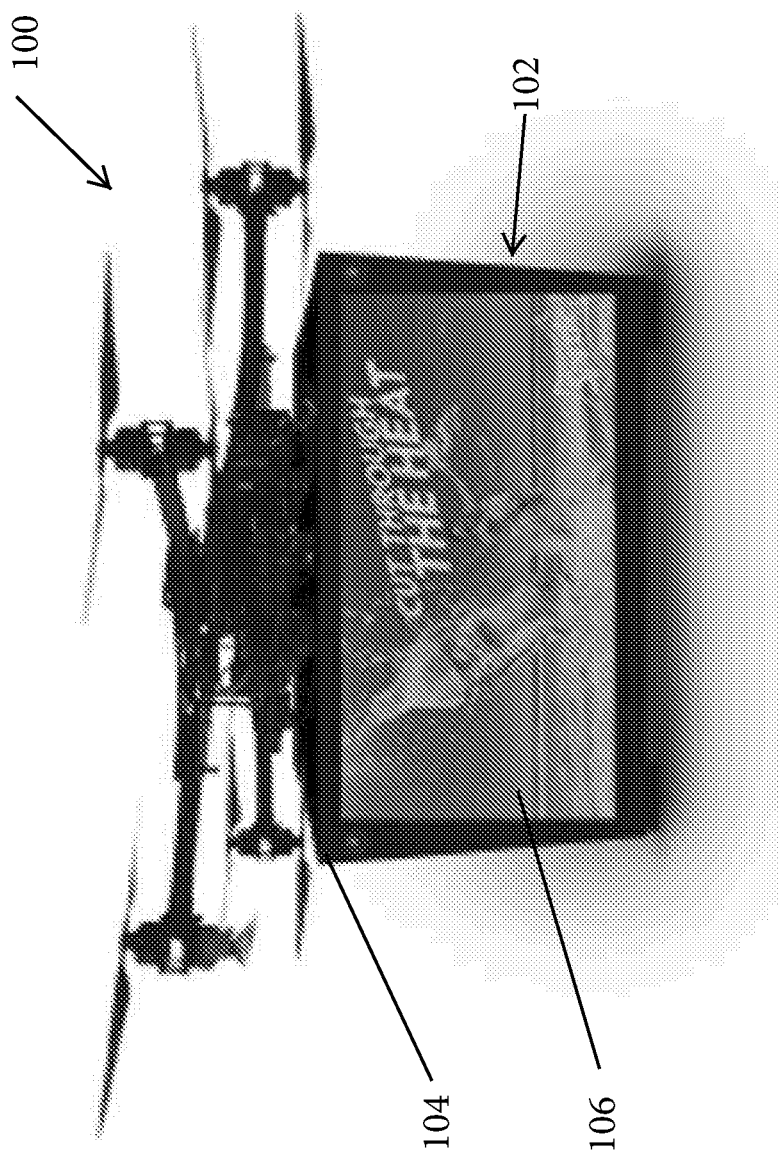
FIG. 1 illustrates a front view of a hovering mechanism, e.g., a drone, with an electronic display according to an embodiment of the instant disclosure.

This disclosure is directed to apparatuses, systems, and methods of hovering promotional advertisements. In particular, the disclosure relates to mechanisms capable of flying and hovering (e.g., conventional drones, modified drones, mechanical structures configured to hover, etc.), and carrying the promotional advertisements (static or dynamic including one or more displays). The disclosure further relates, in particular, to methods used with flying and hovering devices, such as drones, to carry and deliver advertisements to or otherwise engage with people, especially methods using one or more digital, electronic display screens, though in some instances, a display or a portion of a display may be non-digital.

As used hereinafter, the term "drone" is considered to define any mechanical structure configured to and capable of carrying promotional advertisements while hovering and flying. The images of the "drones" depicted in the figures should not be considered as limiting to the possible devices that may be used to perform the above task. Thus, the use of the term "hovering mechanism" may include both conventional drones and devices capable of hovering though not known as "drones." Regardless, the term drone is frequently used hereinafter as a factor of conciseness and convenience rather than the more lengthy and cumbersome "hovering promotional advertisement apparatus."

A "display" may include, but is not limited to, one or a combination of non-digital or digital media, such as artwork, text, video, audio, and other promotional media presented on paper, cardboard, whiteboard, digital display screens, actual product, etc., any of which may be accompanied by live or pre-recorded audible emissions from a component associated with the drone.

There are many ways in which "promotional advertisement" applies to many fields. To be clear, the terms "promotional advertisement" or "advertisement" as used herein are not limited only to the sale or promotion of a product or service. Rather, for the purposes of this disclosure, "promotional advertisement" or "advertisement" may refer also to information distribution in general, including public warnings, service announcements, directions, notifications, instructions, etc. Further, the advertisements may be meant for the public as a whole, a targeted group of people, or specific individuals, and may be displayed in behalf of or by government entities/agencies, public media entities, and/or private entities. Moreover, it is contemplated that a drone may be configured to advertise for a private entity in one moment, and in the next moment, be switched or commandeered for control and/or distribution of information by another party unrelated to the private party, such as in the event of an emergency where a local governmental entity may need to distribute information rapidly.

Additionally, it is noted that throughout the specification, when referring to a "target" for delivery or presentation of an advertisement, as used above, the term "target" may refer to any of the public as a whole, a group of people, or a specific individual who may be located within a crowd of other people or who may be located alone.

Illustrative Embodiments of Modes of Target Engagement

As used herein, the term "engage" with respect to a target of the drone for promotional advertising may refer to one or more types of engagement with the target including, but not limited to a visual engagement, auditory engagement, physical engagement, or wireless connection engagement with one or more personal devices belonging to one or more respective targets. Additionally, the term "engagement" may involve a one-way engagement, in which the engagement refers to the attention of a target being directed to the drone, or "engagement" may involve a two-way engagement, in which the engagement refers to an interactive back-and-forth responsiveness between an attentive target and the drone.

In an embodiment of a visual one-way engagement, the drone may be programmed and/or configured to display specific promotional material, for visual presentation, on a random, looping, or paid-per-display basis. Such a visual display may be intended for all individuals in a group or a portion of all the individuals in the group (e.g., a known, student separated section of a crowd in an athletic event, etc.) who may be within visual range of the drone. In an additional embodiment of a visual one-way engagement, the drone may use analytical information sourced either from sensory devices associated with the drone (e.g., built-in cameras) or event-arranged cameras (e.g., security or other public monitoring cameras) to determine to whom promotional material is best-suited for display. However, the drone may not be intended to receive feedback or interaction instantaneously.

Additionally, and/or alternatively, in an embodiment of a visual two-way engagement, the drone may present the visual display as discussed above with respect to the one-way engagement, and then may further await and detect a response from a target. For example, during a promotional display, using instantaneous and real-time data being captured via video cameras (on the drone or fixed at the event) within the target range of the drone, a processor may instruct the drone to react and fixate on one or more targets to begin interactive engagement. Examples of data detected that may cause the drone to react may include, for example: video of one or more target individuals being attentive to the flight or displayed promotional material of the drone; detection of a predetermined target within line-of-sight of the drone; detection of a target waving at the drone; etc.

In an embodiment of an auditory one-way engagement, while auditory promotions may be emitted via speakers on the drone or from speakers placed near the drone when the drone approaches, no analysis or use of auditory responses, which may have been detected via a microphone, occurs. Thus, in some situations, a drone without a microphone may be used, and the drone may be programmed to emit specific promotional material, for auditory presentation, on a random, looping, or paid-per-play basis. Such an auditory display may be intended for all individuals in a group or a portion of all the individuals in the group (e.g., a known, student separated section of a crowd in an athletic event, etc.) who may be within auditory range of the drone. In an additional embodiment of an auditory one-way engagement, the drone may use analytical information sourced either from sensory devices associated with the drone (e.g., built-in microphones) or event-arranged microphones (e.g., security or other public monitoring microphones) to determine to whom promotional material is best-suited. However, again, the drone may not be intended to receive feedback or interaction instantaneously.

Additionally, and/or alternatively, in an embodiment of an auditory two-way engagement, the drone may present the auditory promotion as discussed above with respect to the one-way engagement, and then may further await a response from a target. For example, during a promotional emission, using instantaneous and real-time data being captured via video cameras and microphones within the target range of the drone, a processor may instruct the drone to react and fixate on one or more targets to begin interactive engagement. Examples of data received that may cause the drone to react may include, for example: detection in the audio intake of one or more target individuals verbally responding to promotional material of the drone; detection of a particular response from target; detection of a target calling for the attention of the drone; etc.

Notably, in an embodiment, the drone may conserve weight and space by eliminating speakers and emitting sound via a wireless connection to selected speakers in the vicinity of the target, including those fixed at the event location and/or the speakers of a target's personal electronic device with which the drone may have made a connection. This feature may be facilitated by adaptation of a hardware implemented software application that permits interaction between the drone and/or a remote processor controlling the drone with the speakers and/or personal devices of the target. For example, a target may download an app onto a personal device that is capable of receiving a communication (e.g., auditory, video, and/or text) from the drone or via transmission through the drone, which communication relates to the promotional advertisement of the drone. It is noted further that this functionality may be pre-built into the processing software of the personal device and/or added via a hardware attachment, so as to negate the need to download an app.

In an embodiment of a physical one-way engagement, the drone may be programmed or configured to distribute physical promotional materials, such as brochures, photos, t-shirts, drinks, snacks, prizes, etc. to targets. Such a drone may be equipped with a carrying mechanism (e.g., a basket, a t-shirt "cannon," mechanical arms, etc.), controllable to release the materials as desired to one or more targets. In an additional embodiment of a physical one-way engagement, the drone may use analytical information sourced either from sensory devices associated with the drone (e.g., built-in cameras, microphones, sensors suited for the particular target, etc.) or event-arranged cameras and microphones (e.g., security or other public monitoring equipment) to determine to whom promotional material is best-suited for delivery. However, the drone may not be intended to receive feedback or interaction instantaneously.

Additionally, and/or alternatively, in an embodiment of a physical two-way engagement, the drone may be configured to deliver promotional/advertised materials or products as discussed above with respect to the one-way engagement, and may further await and detect either a request for the materials or products or an action by the target in response to the delivery. For example, during a delivery of promotional materials or products, using instantaneous and real-time data being captured via video cameras, microphones, proximity sensors, and/or other equipment (on the drone or fixed at the event), a processor may instruct the drone to react and deliver the material to one or more targets to begin interactive engagement. Examples of data detected that may cause the drone to react may include, for example: video/audio of one or more target individuals being attentive to the flight or displayed promotional material of the drone; detection of a predetermined target within line-of-sight of the drone; detection of a target waving at or speaking to the drone; receipt of a message sent to the drone in response to a displayed inquiry/advertisement or a challenge/trivia requesting response; etc. Additional examples of a response from a target in a physical two-way engagement may include the target paying for promotional materials or products being delivered by depositing payment in a container carried by the drone or by interacting with a personal device in communication with the drone to make an electronic payment for the physical delivery.

In an embodiment of a wireless one-way engagement the drone may be programmed and include hardware suitable for wireless transmission of promotional advertisements via Bluetooth, Wi-Fi, RF signals, etc. to personal devices of targets. Additionally, and/or alternatively, in an embodiment of a wireless two-way engagement the drone may be further configured to act as a hotspot transmission point for relaying messages between the personal devices of targets and event hosts, and/or a receiver for requests of additional information related to the promotional advertisements, in which case, the drone may reply with the information or hyperlinks to the information requested.

Illustrative Embodiments of Promotional Advertisement Members on Drones

In an embodiment using one or more digital display screens as promotional advertisement members for advertising, the display screens are lightweight in order to be accommodated by the drone. Note, "promotional advertisement member" may also refer to static advertisements, such as banners. For example, a drone may carry a digital display screen and a banner simultaneously and display from different angles or sides of the drone. Additionally, in general, the term "lightweight" as used above is considered in comparison with the much heavier weights of recent and some contemporary computer and TV display screens, or laptops having screens. Further, a weight of the one or more display screens is relative to the amount of load the drone is capable of carrying while maintaining other flight and functionality requirements, including adherence to public safety regulations and maintaining the desired promotional effect of the drone.

In an embodiment, a digital screen for implementation in the instant disclosure may include: a sheet of a durable material (e.g., polymer, glass, metal, etc.) having one or more light emitting sources (e.g., "LEDs" including any of: microLEDs varying in size from 10 microns to 100 microns, miniLEDs varying in size from 100 microns to 300 microns, or standard LEDs varying in size greater than 300 microns; QLED technology; quantum dots; etc.); a screen of a tablet device (e.g., about 5 inches to about 13 inches, or larger, measured across a greatest dimension); an LCD display (e.g., in color, grayscale, or black-and-white) connected to an onboard or remote controller; etc. In an embodiment using the sheet of durable material having one or more light emitting sources, a plurality of LEDs may be attached to the sheet in an array and interconnected in a programmable system, where each LED, or localized groupings of LEDs, may be independently addressable to activate as programmed to collectively form a desired image. Moreover, the screens contemplated may include high-resolution screens for day and night viewing.

There are multiple ways the screen might be attached to a drone, including: suspended or secured to a central area of the bottom of the drone, secured to the top of the drone, or secured to the side of the drone. For example, in an embodiment, the screen(s) may be positioned as close to the center of mass as possible, spaced apart or back to back. Alternatively, screens may be positioned around the drone at respective equidistances from the center of mass.

In other embodiments, where more than two screens are used, the screens may be oriented with respect to each other and the body of the drone in many ways. For example, an embodiment may include multiple screens arranged in a three-dimensional geometric shape (e.g., cuboidal, parallelepiped, cylindrical, quasi-spherical or hemi-spherical) with respect to each other and the drone body via adjacent edges of the screens. That is, in an embodiment of a cuboidal arrangement, an underside of the drone body may be partially hidden via four screens including two opposing pairs of screens, each facing with the display outward from the body of the drone, each of the four screens being oriented to face orthogonally with respect to the laterally adjacent screens such that lateral edges of each screen are adjacent another lateral edge of a screen. Thus, though the top face of the cuboidal shape is replaced by the drone body and though missing a bottom face, from a perspective view, the shape may generally be considered to appear as cuboidal. Further, depending on the capabilities and structure of the drone used, a more complete cuboidal shape may be formed by adding a fifth screen or other panel/sheet (static advertisement or non-promotional material) on the bottom side. Regardless of the arrangement of the one or more screens, it is contemplated that the drone selected to pair with the display screen(s) is adequate, both in structure and functionality, to accommodate carrying the display screen(s).

Moreover, screens may be fastened and secured to the drone via one or more of clips, screws, adhesive strips or other adhesive resin, bolts, etc. to one or more screen support members extending from the body of the drone. For a drone that is not pre-designed with a means of attaching a display screen thereto, modifications may be made to accommodate a structure and/or a structure may be incorporated to the drone to carry the display screen(s). In order to effectively and safely fly the drone, while simultaneously ensuring that the drone is positioned in a suitable place from which advertisements on the screens are able to adequately engage the target, the screens may be securely fastened to a supporting member of the drone and positioned thereon to balance the load. In an embodiment, display screens may be oriented in a substantially vertical direction or at an angle between 0° and 90°, and may be secured at corners thereof in a stretched position between a frame surrounding the screen. Speakers, cameras, sensors, and other equipment useful for implementation of the features disclosed herein may be positioned between adjacent screens or adjacent to lateral edges thereof.

In an embodiment of a single display screen carried from a lateral side of the drone body, a structural frame may be attached to extend outward from the drone, and the drone may include a counterbalancing mechanism to balance the weight and/or assist in stabilizing a flight path or a hover position of the drone.

In an embodiment where more than one display screen is used, pairs of screens may be placed on opposite sides of the drone such that a space exists between opposing screens and such that the weight carried by the drone is balanced, or the screens may be placed back to back.

In yet another embodiment, flexible display screens may be implemented that are functional when curved or planar. For example, the screens may curve at both lateral sides and when adjacent edges are placed together, the screens may form a cylindrical or elliptical outer shape. Using flexible display screens, a promotional advertisement may be displayed in a 360-degree view around the drone's position, and the advertisements may be programmed to scroll or move around the screens passing from one to the other seamlessly. Due to the flexibility of the screens, in an outdoor event, if wind is forcing the drone to move due to the exposed surface area of the enclosed screen arrangement, the screens may be configured to switch from the curved state to the planar state to allow the wind to pass between the planar screens more easily and reduce the influence of the wind force on the drone in flight. Such may be accomplished mechanically (e.g., via electro-mechanically actuated members, etc.) to pull, push, release from tension, etc. the edges of the screens. Alternatively, it is contemplated that shape memory material may be implemented with the screen, and the screen shape may be controlled using shape memory technology to relax the curvature and become planar. For example, a shape memory material may be implemented in a fiber form and placed on a display screen sheet, and when the shape memory feature of the material is actuated, the fiber shifts to a memorized shape (e.g., having a specific curvature or other shape), thereby flexing the screen(s). Other implementations of the use of shape memory materials are contemplated, though not explicitly described herein.

Moreover, additional variations of orientations of the screens positioned with respect to the drone body and variations of means of connecting the screens to the drone are described herein.

The structure of the screen support members may vary widely. In some embodiments, the structure may include linked, lightweight bars or beams that extend outward from the drone and to which display screens, carrying mechanisms, grabber mechanisms, etc. are attached securely in a manner that avoids interruption of the drone flight components, e.g. blades, cameras, distance sensors, etc.

In an embodiment, the drone may be used to engage target individuals or target groups of people, in an event, for example. That is, the drone may be equipped to communicate with one or more processors and memory having instructions thereon to control the drone's path flight, and onboard cameras and/or microphones and/or speakers. The one or more processors and/or memory may either be onboard the drone or in an external device with which the drone communicates wirelessly.

The one or more processors may be configured to instruct the drone to display on the screens preprogrammed cyclical or non-cyclical information stored on the memory. Additionally, artificial intelligence/machine learning processing and programming ("AI" and "ML") may be implemented to run within the hardware and software of the one or more processors to detect characteristic aspects of the target individuals or groups, such as: age, gender, interests (based on elements associated with individuals including clothing, food, drinks, cars, etc.), size, seating location (high end, low end), race, etc. Such aspects may be processed by the one or more processors to categorize and predict personality traits, life status, likes and dislikes, habits, interests, etc. about the target's personal lives. Using this knowledge, the drone may be instructed automatically to provide specially targeted advertisements that are more likely to appeal to one or more individuals of the group.

In an embodiment, the promotional advertisements displayed on the drone screens may be interactive and may engage one or more individuals in back and forth communication using one or more cameras, and/or microphones, and/or speakers. For example, the programming for the display may be configured to cycle through a routine of fixed questions and answers in order to direct the target to a desired outcome or a predictable response. Additionally, and/or alternatively, the programming for the display may be configured to use AI to interpret the responses of a target, and modify the routine of the promotional advertisement subsequent to an unexpected or uncharacteristic answer from a target. Thus, in the embodiment using AI, the display may show a different, more relevant question or answer with respect to the actual response provided in order to appeal more directly to the target.

Inasmuch as there are many approaches to artificial intelligence (AI) and machine learning (ML) techniques of processing data to improve results of analyzing and assessing features and characteristics of individuals and groups of people, the exact methods, techniques, or algorithms used to implement AI and/or ML within the system, apparatus, and method of promotional advertisement described herein are not provided in great detail. However, some aspects of the use of the system, apparatus, and method of promotional advertisement which are useful in incorporating into the algorithms used by the AI or ML processes to detect targets may be described in greater depth herein.

Some examples of promotional advertisements and target interaction ideas may include at least one of displaying, emitting auditory transmissions for, delivering, or wirelessly communicating: programmable ad spots on rotation; multiple ad spots per drone on a timed rotation; photo, video, or live streaming content; scannable codes (e.g., QR codes, etc.) for coupons and discounted items by local or event vendors; trivia activities and sweepstakes prize winners; interactive games; amber alerts; safety instructions; updates regarding other related or non-related events relevant to the group or individual; event offers; directing vendors to the location of the group or individual; ordering product; display user generated content; live video including simulcasting and remote viewing and audio; "kiss cam"; drone selfies via JumboTron screen; AI recognition; crowd sampling and reporting; serial photos and video images to analyze for key insights such as demographics (e.g., race, age, gender, happiness scores, accuracy verification, etc.); custom API (application programming interface) creation based on data; cell phone interactivity; drive traffic to online info; drive traffic to concessions; social display advertising; geo-targeting; social media interaction; landing page; opt-in Wi-Fi hotspot via the drone; augmented reality possibilities; A/R markers; point cell phone at drone to display a new A/R image or video sequence; light/laser shows; ticket purchasing; integration with event media and entertainment technology (e.g., drones may be used as part of a performance); missing persons or belongings; crowd notifications; traffic alerts and warnings; weather notifications; parking alerts and notifications; waypoints and directions; threat detection and alerts; fundraising efforts; venues include private and public, stadiums, arenas, coliseums, museums, golf courses, beaches, parks and recreation facilities, amusement parks, race tracks, casinos, private residences, concerts, bars and restaurants/night clubs, convention concerts, parking lots, community centers, schools/universities, national forests, wineries and vineyards, fairgrounds, cultural centers, amphitheaters, hotels, libraries, indoor or outdoor events, sporting events, parties, celebrations, tradeshows, etc.; emergency response/public services including surveillance; interactive customer dashboard availability from which a customer can manage and monitor performance in real time; etc. In a further embodiment, with respect to the aforementioned interactive customer dashboard, it is contemplated that the drone may be in communication with an interactive app for customers and/or targets to see the drone (location or display) as well as to be able to request the presence of the drone for interaction such as codes/games/etc.

Illustrative Embodiments of a Hovering Promotional Advertisement Apparatus

Specifically, the accompanying documentation illustrates additional aspects and features contemplated for the implementation of a hovering promotional advertisement apparatus according to the instant disclosure.

FIG. 1 illustrates a front view of a hovering promotional advertisement apparatus 100 (hereinafter referred to as "drone 100"), that is configured to hover in the air while holding in place one or more promotional advertisement members 102, as defined above (hereinafter, "promotional advertisement member" may refer to one member or a plurality of members). The promotional advertisement member 102 may be secured to the drone 100 via a support structure 104 that does not interfere with flight and hover capabilities of the drone 100. In an embodiment, the promotional advertisement member 102 may include a digital display screen, which may feature one or more digital advertisements or other promotional information 106, e.g., games, sales ads, warnings, public notices, directions, streaming video, replays of actions occurring at the event attended by the targets, etc., that may be displayed sequentially over a period of time or may be static. In an additional and/or alternative embodiment, the promotional advertisement member 102 May include non-dynamic promotional material, such as printed displays on paper, plastic, or other durable material.

Figure 2:
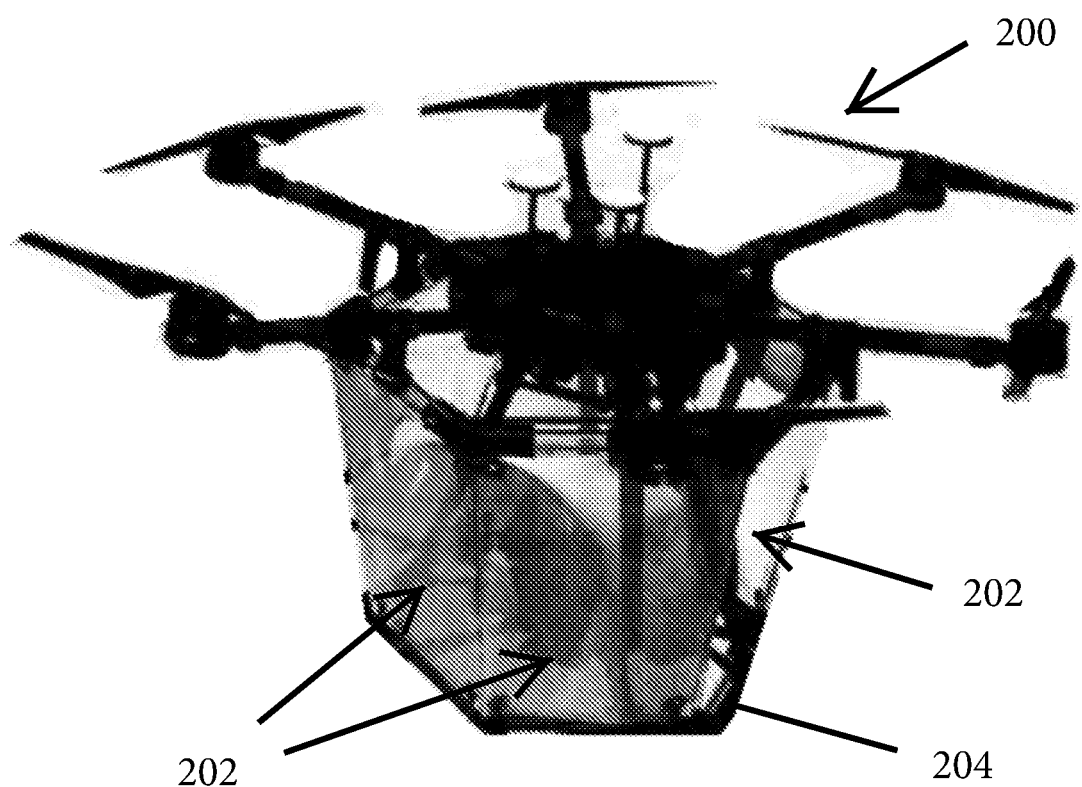
FIG. 2 illustrates a perspective top-facing view of a drone with multiple electronic displays according to an embodiment of the instant disclosure.

FIG. 2 illustrates a perspective view of a non-limiting embodiment of a possible configuration and orientation of a hovering promotional advertisement apparatus 200 (hereinafter referred to as "drone 200") that is configured to secure a plurality of promotional advertisement members 202. As shown, the promotional advertisement members 202 are disposed edge to edge encircling the underside of drone 200. The promotional advertisement members 202 may be secured to drone 200 via support structure 204 in a variety of manners using a variety of fasteners (not shown explicitly).

Figure 3:
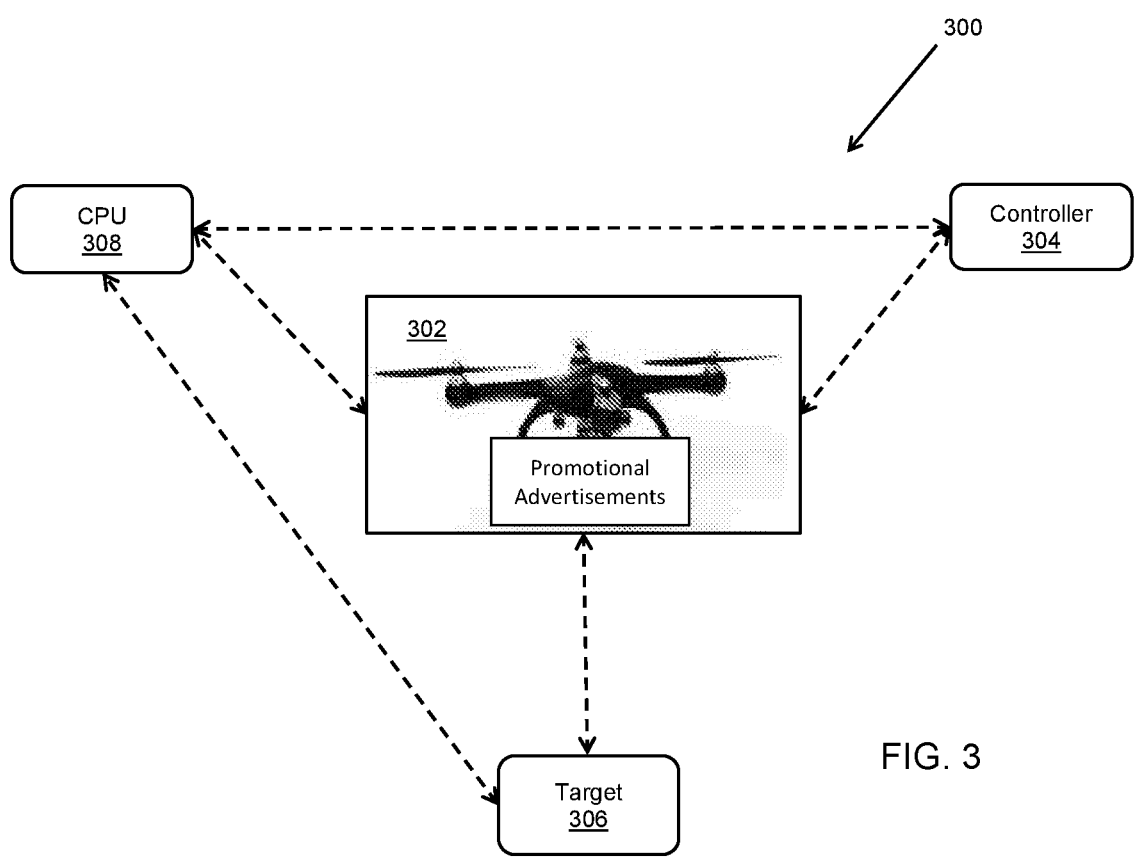
FIG. 3 illustrates a schematic of a system in which a drone is used according to an embodiment of the instant disclosure.

FIG. 3 illustrates a schematic embodiment of a system 300 in which a hovering promotional advertisement apparatus 302 (hereinafter referred to as "drone 302") is used according to the instant disclosure. In an embodiment, a user may navigate drone 302 via controller 304 to display promotional advertisements to a target 306. Controller 304 is wirelessly connected to direct drone 302 to a desired location to begin to display promotional advertisements to a target 306. In an embodiment, drone 302 may collect data via attached or nearby cameras and audio equipment and/or other sensory equipment to relay observations regarding target 306 to a central processing unit "CPU" 308. CPU 308 may include one or more computing processors in communication with memory to store and process data collected and observed by the equipment associated with drone 302. In some instances, the one or more processors and/or memory may be onboard drone 302. In other instances, the one or more processors and/or memory may be located remotely from drone 302 and may further be directly connected with or wirelessly connected with controller 304. In an embodiment where CPU 308 is in communication with controller 304, CPU 308 may be configured to command control of drone 302, separate from or in conjunction with the user.

Command of drone 302 by CPU 308 may occur, for example, when AI or ML processing software indicates that a target is detected, and a different hovering or display position will be more effective with respect to the target. That is, CPU 308 may be using the one or more processors and associated memory with data storage to run data analysis on the observational data collected by equipment on drone 302. During the analysis, CPU 308 may determine that the promotional advertisements being displayed (or which will soon be displayed if on a rotation) will likely be more effective to engage the detected target if drone 302 is redirected to a position from which a particular individual or group (i.e., the target) is more likely to notice and become engaged with the promotional advertisement. Accordingly, via AI and/or ML processing of the data, the promotional advertisements become more valuable to a producer/supplier of the promotional advertisement since the information is more likely to be presented to a target that is more likely to have an interest in the promotional advertisement.

Alternatively, in the event CPU 308 determines a target 306 for promotional advertisements, CPU 308 may relay the location of target 306 to the user controlling drone 302 via controller 304, and the user may then navigate drone 302 to a position adequate for notice of the promotional advertisement by target 306. For example, if compliance with a regulatory body prevents an AI processing device or software to command drone 302, it is contemplated that the user may receive detailed instructions instead to potentially avoid an error and subsequently injure a target. Moreover, the user of controller 304 may always be able to override a drone that is potentially being controlled in a dangerous manner. Further, an emergency "parachute" (not shown) may be deployed in a drone failure situation.

Notably, schematic 300 indicates that information may flow in both directions between drone 302 and each of controller 304, target 306, and CPU 308. That is, controller 304 may receive positional feedback information from drone 302 to maintain proper flight position, and of course, controller 304 flows information to drone 302 to provide directional instructions for flight. CPU 308 receives and transmits data to drone 302 to analyze received data and to potentially relay responses to target 306 via drone 302 and to dictate which promotional advertisement to display. Information may flow from target 306 to drone 302 in an interactive situation in response to the promotional advertisement being displayed. Additionally, and/or alternatively, target 306 may ultimately interact with CPU 308 if directed to a means of connection, such as a URL, as provided to target 306 via drone 302, for example. Thus, in an embodiment, it is contemplated that CPU 308 may include cloud processing services accessible via a URL or other connection to each of drone 302, controller 304, and target 306.

Miscellaneous aspects of the system 300 may include: audio connectivity via Bluetooth and Wi-Fi; data connectivity via Wi-Fi and 5G or lower/higher connection speeds; multi-sided camera setups for crowd analytics and content capture purposes; ground based workstation for programmatic servicing and flight controls; and a parachute safety system.

Figure 4:
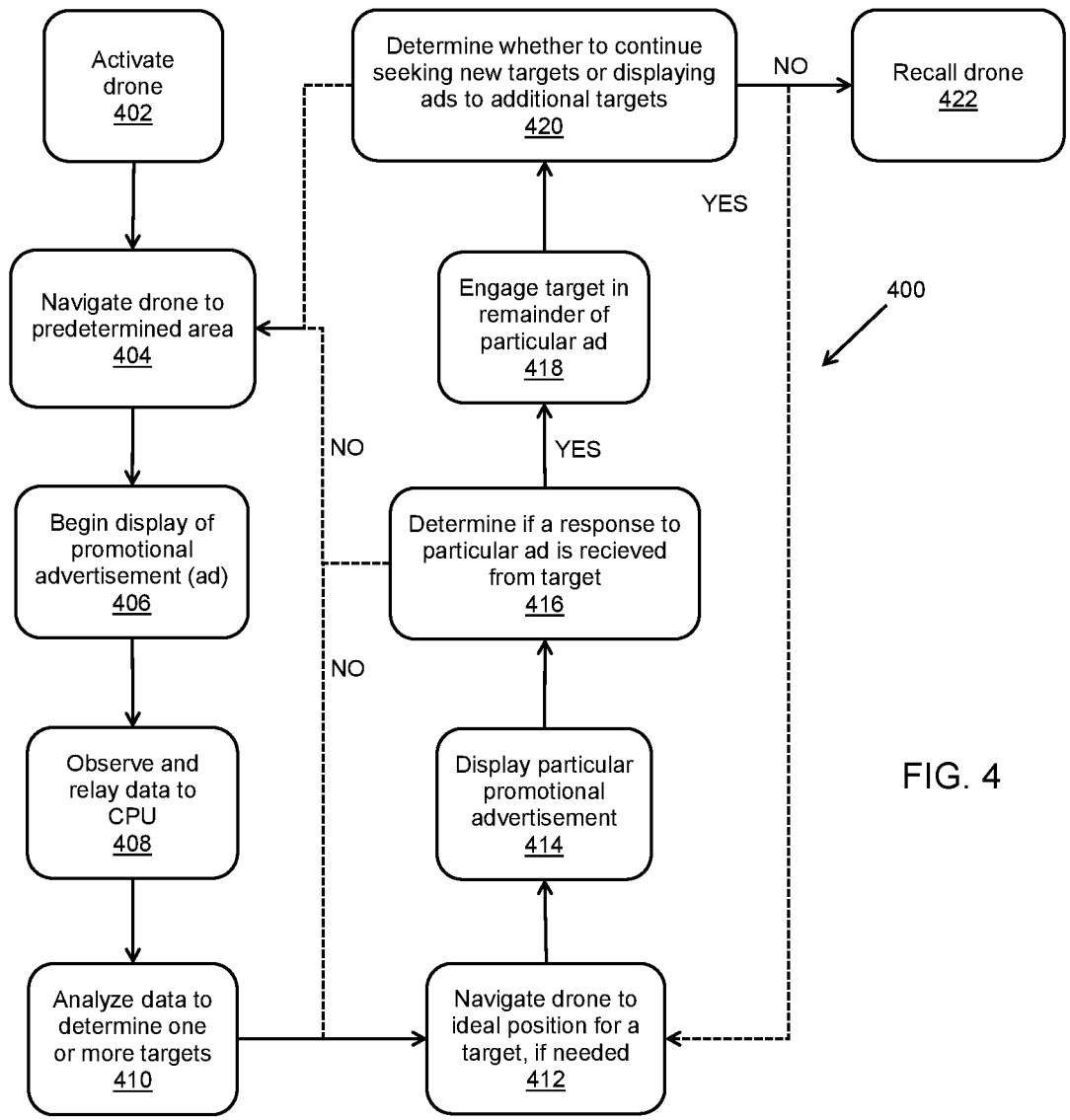
FIG. 4 illustrates a flow chart of a method of drone use according to an embodiment of the instant disclosure.

FIG. 4 illustrates a flow chart of a method 400 of drone use according to an embodiment of the instant application. In step 402, the drone is activated and communication is initiated with the controller and CPU. The drone may then be navigated to a predetermined area in step 404 to begin the display or presentation of the promotional advertisement ("ad" in some steps for convenience) in step 406. Once in position, in step 408, the sensory equipment (e.g., cameras, microphones, and/or accessible personal devices of potential targets, which may use an application that permits the drone to have access to the knowledge of their location), etc. begins to observe and relay data to the CPU, where the data may be collected and/or recorded. The drone may be hover in place or may be mobile during step 408. Step 410 initiates by analyzing the data collected to determine targets according to the promotional advertisements for display or presentation. If a target is determined, the method 400 proceeds to step 412, in which the drone is navigated, either manually or automatically, if necessary, to an ideal position in which the promotional advertisement is most likely or more likely to be noticed and by and engage with the target. If no target is determined in step 410, the method 400 continues analyzing data and may move to acquire additional data from other potential targets. Depending on the type of data sought, it may be beneficial for the drone to remain in a position and observe one or more potential targets for an extended time period. For example, the CPU may indicate that behavior over a fixed time period is useful to observe.

Upon navigating to the ideal location for a target in step 412, a particular promotional advertisement may be displayed in step 414. In an embodiment in which the particular promotional advertisement requests a responsive engagement with the target, the method 400 continues in step 416 by determining if a response is provided by the target. If a response is provided, in step 418, the target is further engaged according to the remainder of the particular promotional advertisement. Next, if the target does not engage in a responsive engagement with the display/presentation of the drone, then the method 400 reverts to either step 404 to navigate to a different predetermined area or to step 412 to navigate to a different target, if one has been determined already. Additionally, if the target completes engagement with the particular promotional advertisement, then the method 400 may continue by again either shifting to a new area and resetting to step 404 or engaging the next target in step 412. Thus, the next step 420 determines whether to continue on with seeking new targets or displaying ads to additional targets. Some potential reasons for not continuing are described below.

Method 400 ends in step 422 by recalling the drone when any of the following occur, including, but not limited to: 1) drone battery drain; 2) termination of the allotted usage of the drone; or 3) an expected or actual failure of the drone for events other than battery drain.

It is noted that not all of the steps of method 400 may be performed while still accomplishing an effective process of promotional advertisement using a hovering mechanism. As such the scope of this disclosure may cover a method including less than all of the above steps. Moreover, in some instances, the steps may be performed in a different order than that shown above, and/or the method may include additional steps not explicitly elaborated with respect to FIG. 4, but which are derivable from the remainder of the disclosure and drawings.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A computer implemented method of displaying a message to an observer, the method comprising:
   on a drone comprising a CPU, sensory equipment, and at least one display:
   a. activating the drone;
   b. initiating communication with a controller configured to receive positional feedback information from the drone to maintain proper flight position, and flow information to the drone to provide directional instructions for flight;
   c. moving the drone to a first predetermined area;
   d. displaying a first message on the drone to first observers at the first predetermined area wherein the first observers are a crowd of potential targets;
   e. observing by the sensory equipment data at the first predetermined area;
   f. relaying by the sensory equipment the data to the CPU at the first predetermined area;
   g. recording by the CPU the data while the drone is hovering in place at the first predetermined area;
   h. analyzing the data by the CPU to determine targets wherein the targets are a specific individual located within the crowd potential targets;
   i. moving, in response to identifying targets, the drone to an ideal location wherein the ideal location and first predetermined area are different;
   j. displaying a particular promotional advertisement on the drone the particular promotional advertisement requesting a responsive engagement with a first target wherein the particular promotional advertisement and first message are different;
   k. determining if a response is provided by the first target at the ideal location in response to displaying the particular promotional advertisement;
   l. moving the drone to a second predetermined area wherein the first predetermined area and second predetermined area are different; and
   m. recalling by the at least one processor the drone.

2. The method of claim 1, the particular promotional advertisement is specific to the first target and the first message is not specific to the first target.

3. The method of claim 1, the particular promotional advertisement is specific to the first target and dependent on the data from the first observers to the first message.

4. The method of claim 1, further comprising determining by the CPU whether to display the particular promotional advertisement to the first target or displaying the first message to a second set of one or more targets wherein the second set of one or more targets is different from the first target and first observers.

5. The method of claim 1, further comprising determining by the CPU whether to continue displaying the particular promotional advertisement to the first target or displaying the first message to a second set of one or more targets.

6. The method of claim 1, wherein the first message is non-digital and the particular promotional advertisement is digital wherein the non-digital message is presented on paper, cardboard, whiteboard, or is actual product.

7. The method of claim 1, wherein the data is non digital detection of the first target waving at or speaking to the drone.

* * * * *